(12) United States Patent  
Suzuki

(10) Patent No.: US 7,738,023 B2  
(45) Date of Patent: Jun. 15, 2010

(54) TIMING SIGNAL PROCESSING APPARATUS FOR CONTROLLING DRIVING OF IMAGE-CAPTURING ELEMENT, AND CAMERA

(75) Inventor: Hiroshi Suzuki, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 865 days.

(21) Appl. No.: 11/500,029

(22) Filed: Aug. 7, 2006

(65) Prior Publication Data

US 2007/0035650 A1 Feb. 15, 2007

(30) Foreign Application Priority Data

Aug. 12, 2005 (JP) ............................. 2005-234570

(51) Int. Cl.
*H04N 3/14* (2006.01)
*H04N 5/335* (2006.01)
(52) U.S. Cl. ..................... 348/317; 348/312; 348/294; 250/208.1
(58) Field of Classification Search ................. 348/312, 348/294–324
See application file for complete search history.

(56) References Cited

U.S. PATENT DOCUMENTS 6,295,416 B1  9/2001  Dowe et al.
6,304,722 B1  10/2001  Lawther et al.
2003/0035059 A1*  2/2003  Suzuki .................. 348/362
2004/0036776 A1  2/2004  Wakabayashi et al.

FOREIGN PATENT DOCUMENTS

JP  2003-60994 A  2/2003

OTHER PUBLICATIONS

Taiwanese Office Action dated Nov. 27, 2009 and English translation thereof issued in a counterpart Taiwanese Application No. 095129466.

* cited by examiner

*Primary Examiner*—David L Ometz
*Assistant Examiner*—Antoinette T Spinks
(74) *Attorney, Agent, or Firm*—Frishauf, Holtz, Goodman & Chick, P.C.

(57) ABSTRACT

A timing generator sets a 1-frame period, in which a pixel signal is read from a CCD, at a first period or a second period that is longer than the first period. The timing generator outputs specific timing signals (with optimal driving frequencies) to a vertical driver and a horizontal driver. If it is discriminated that the timing signal for a time period necessary for reading the pixel signal for one frame is output, the timing generator stops the output of the timing signal. Thereby, power saving can be achieved without deterioration of image quality, while reading of the pixel signal is being executed with an optimal driving frequency for the image-capturing element.

9 Claims, 10 Drawing Sheets

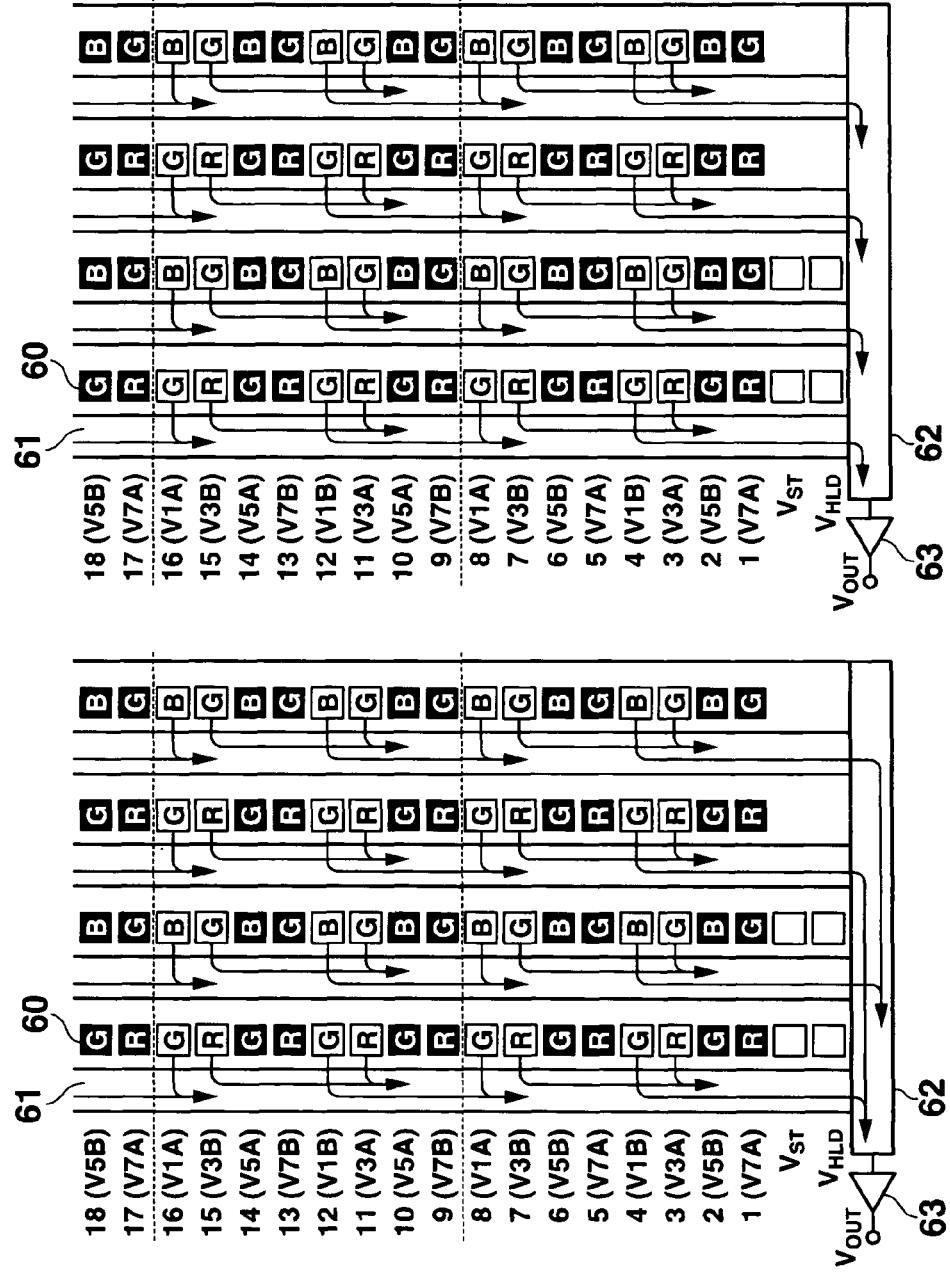

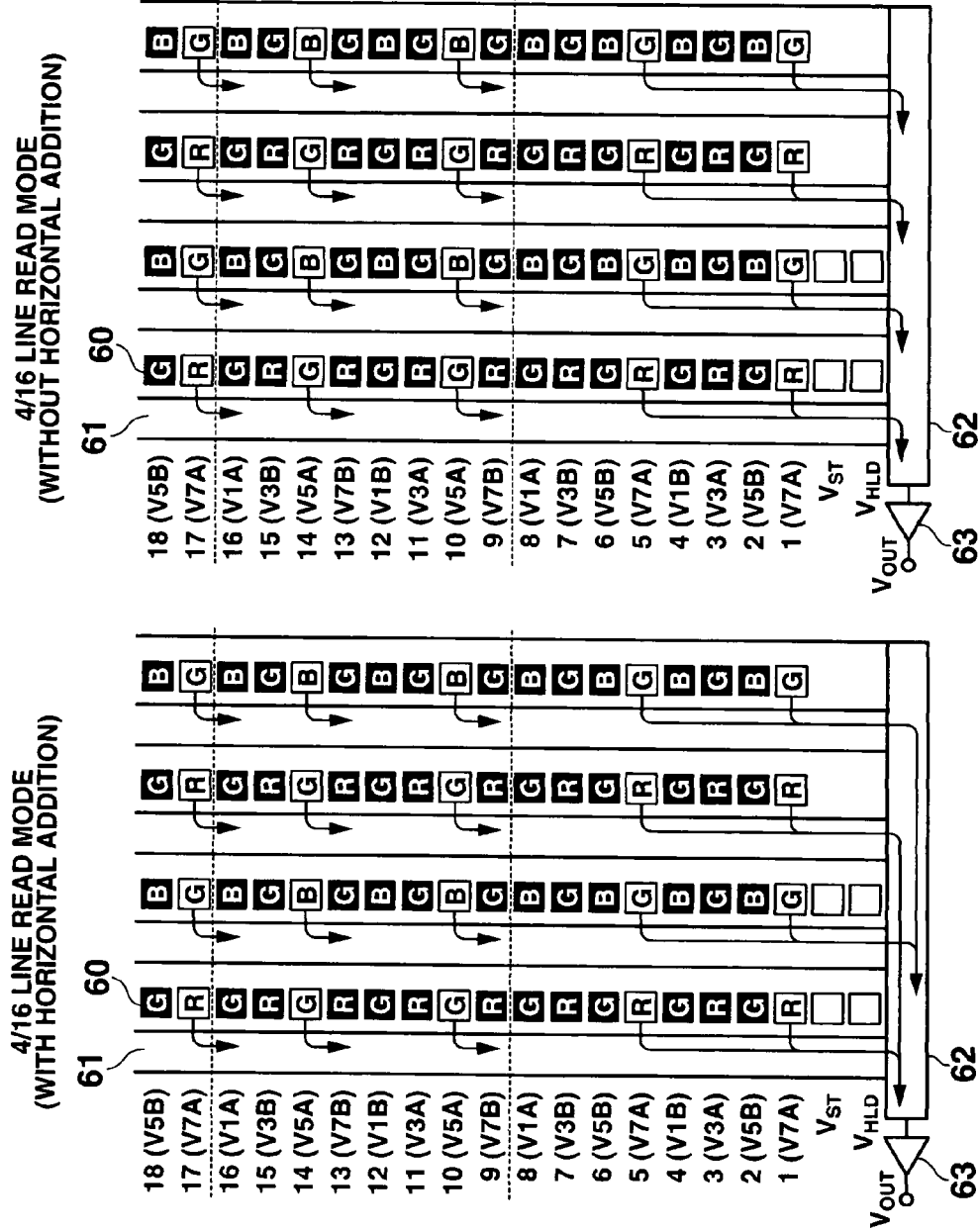

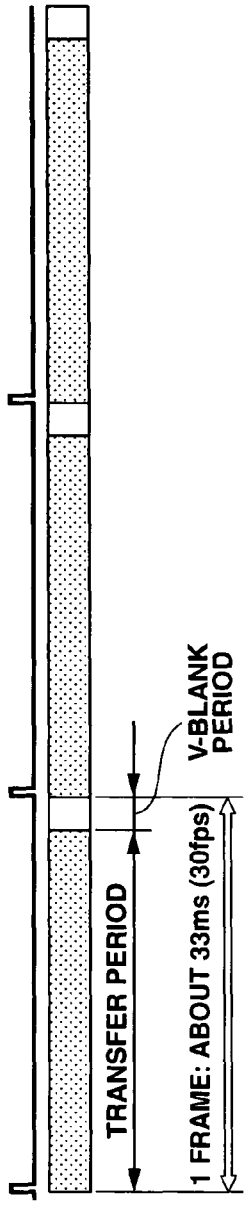
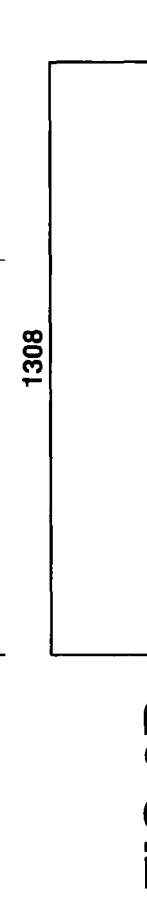
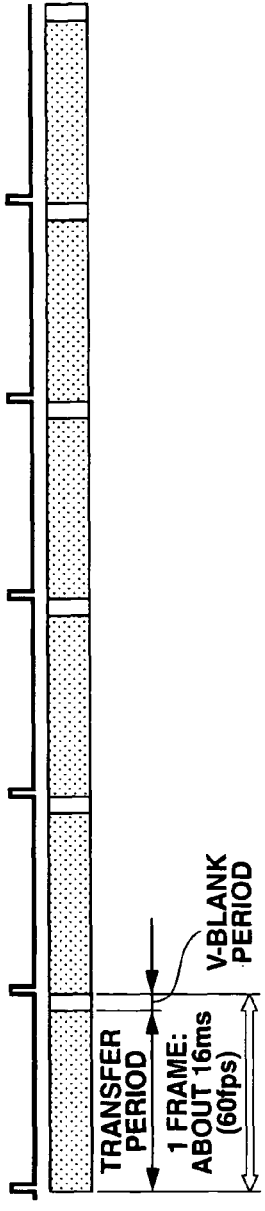
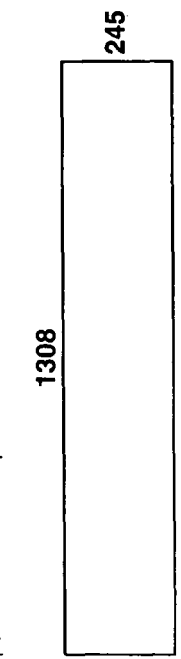

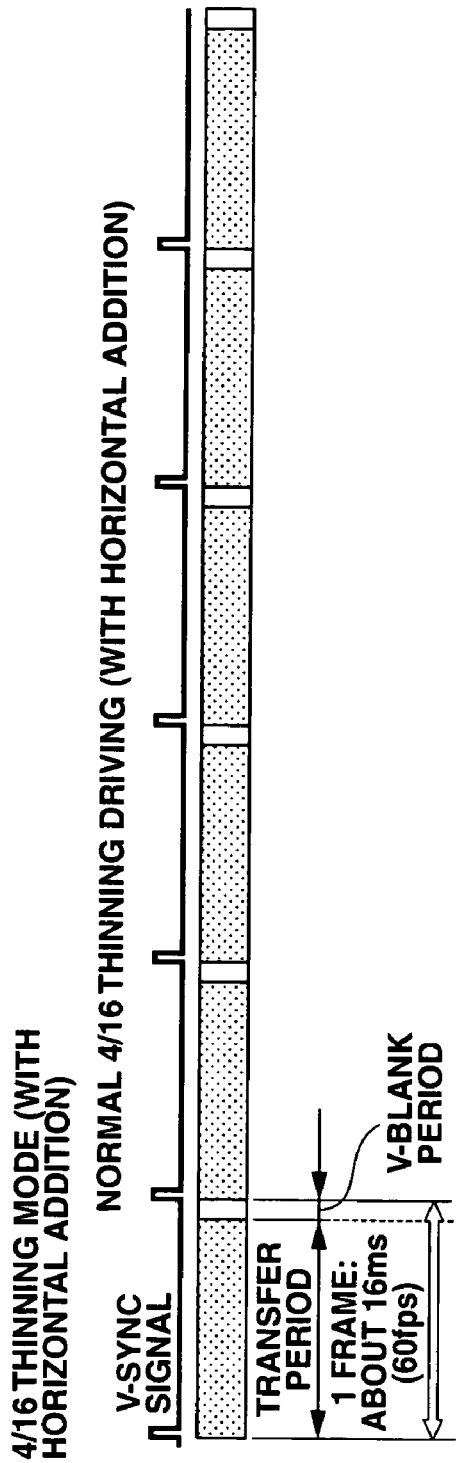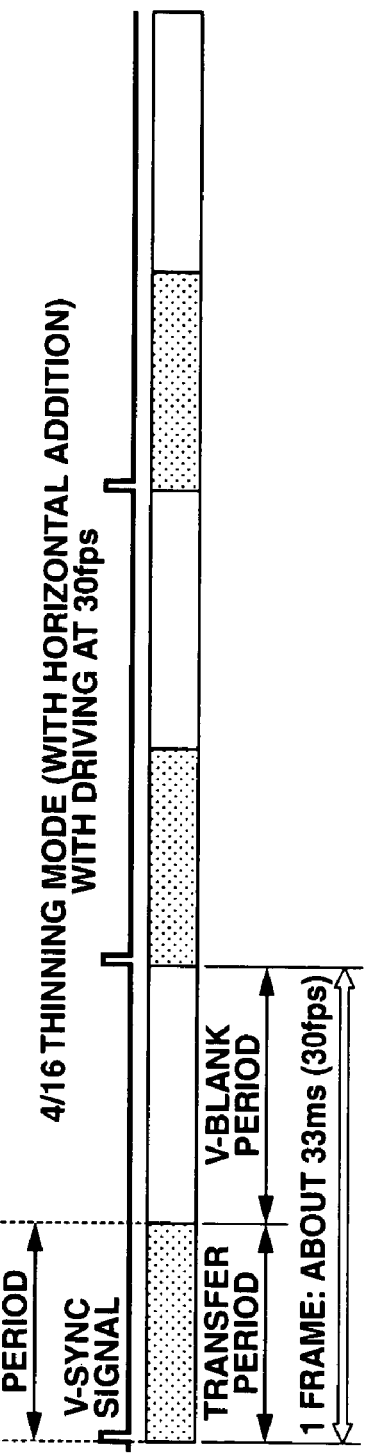

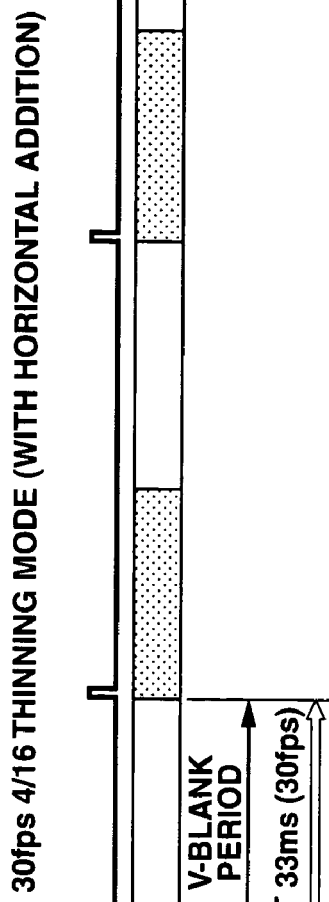
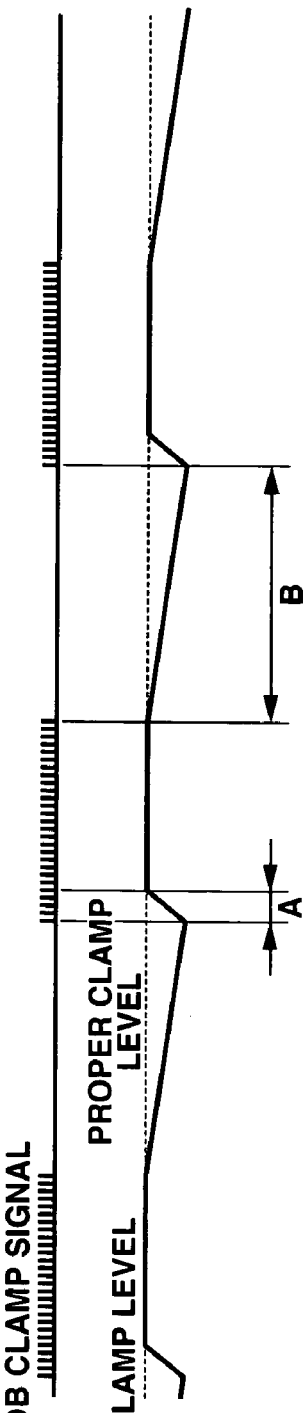
FIG.10A 30fps 4/16 THINNING MODE (WITH HORIZONTAL ADDITION)
FIG.10B OB CLAMP SIGNAL
FIG.10C CLAMP LEVEL

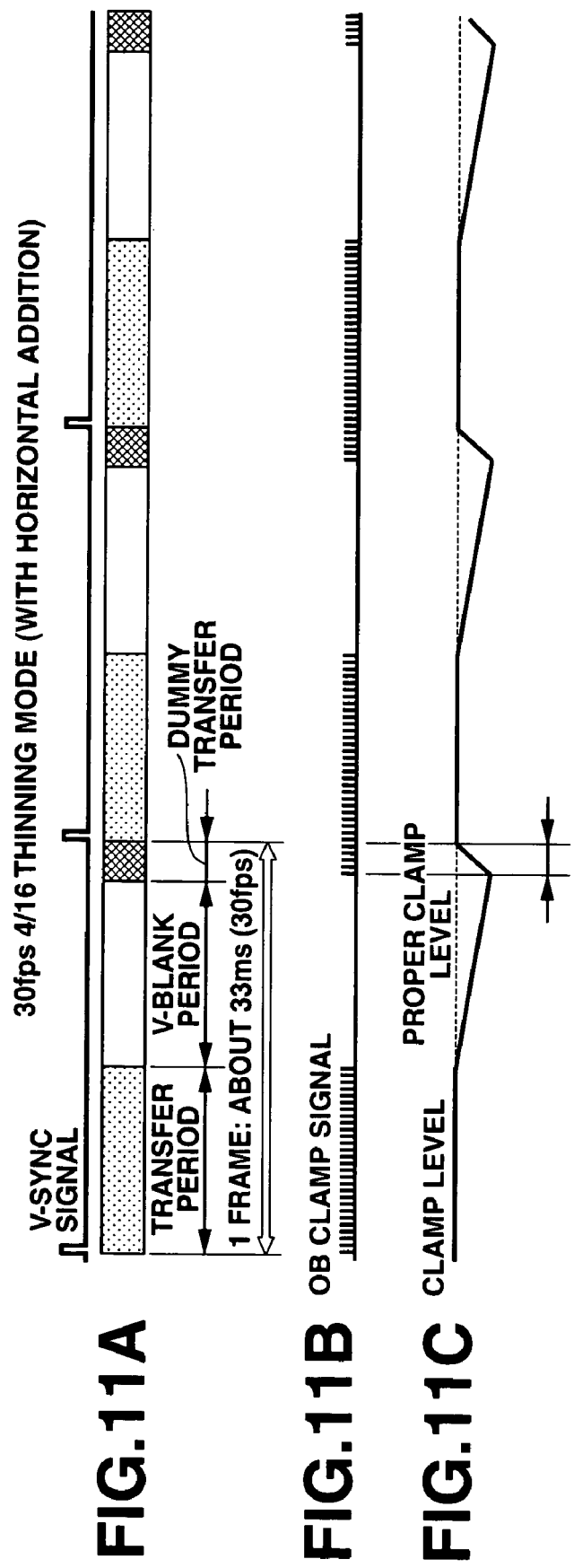

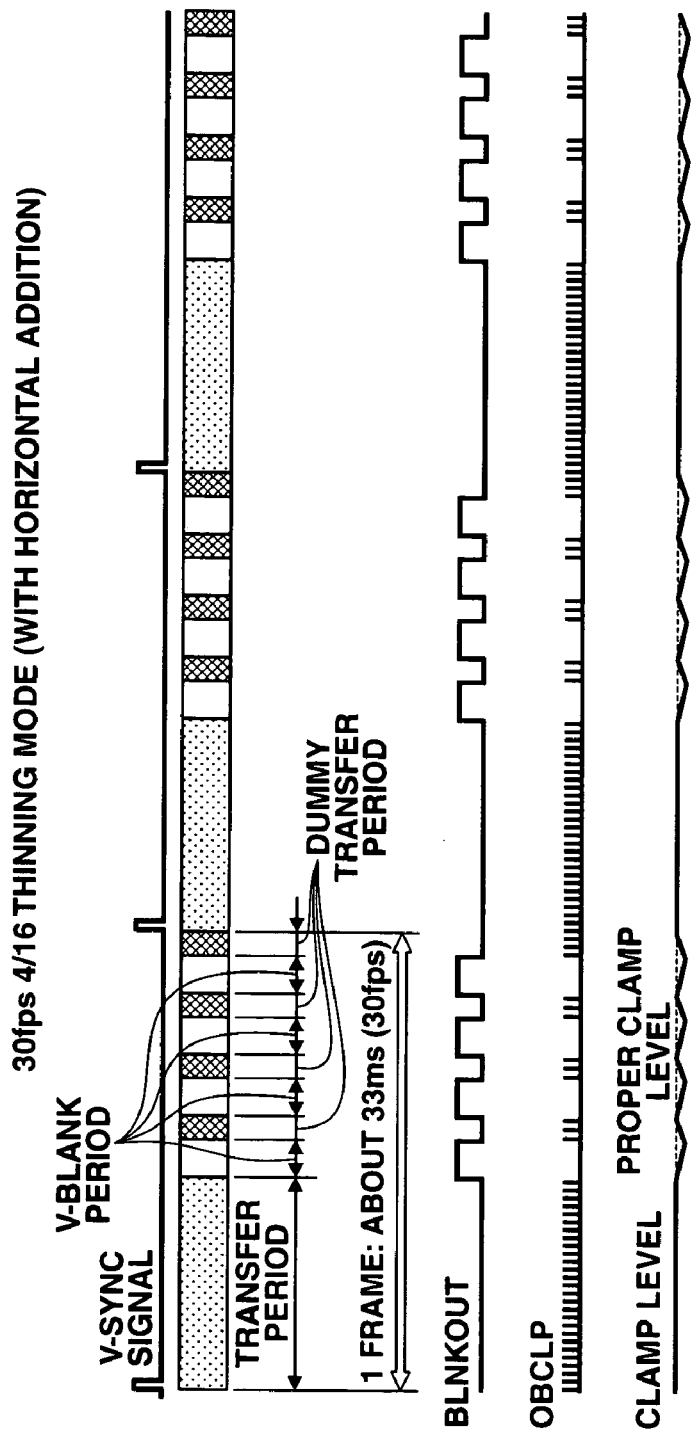

US 7,738,023 B2

TIMING SIGNAL PROCESSING APPARATUS FOR CONTROLLING DRIVING OF IMAGE-CAPTURING ELEMENT, AND CAMERA

CROSS-REFERENCE TO RELATED APPLICATIONS

This application is based upon and claims the benefit of priority from prior Japanese Patent Application No. 2005-234570, filed Aug. 12, 2005, the entire contents of which are incorporated herein by reference.

BACKGROUND OF THE INVENTION

1. Field of the Invention

The present invention relates to a camera, such as a digital camera, a digital video camera or a camera-equipped mobile phone, which generates a timing signal for driving an image-capturing element and reads out a pixel signal, and a timing signal processing apparatus which generates a timing signal for use in the camera.

2. Description of the Related Art

In recent years, with an increase in the number of pixels in cameras such as digital cameras, there is a tendency for higher power to be needed to drive an image-capturing element such as a charge-coupled device (COD). In addition, with the provision of various functions such as an anti-shake function (correction of image distortion due to shaking of the hand), there is a tendency for the power consumption of the entire camera to increase. In contrast, in consideration of the convenience for users, there is a demand for longer battery life, that is, lower power consumption.

In the prior art, there has been proposed a camera which can reduce power consumption in the case where a CCD with a great number of pixels is used (see, e.g. Jpn. Pat. Appln. KOKAI Publication No. 2003-60994).

In the prior-art camera, the power consumption is reduced by switching the driving frequency of a driving pulse, which is supplied from a timing signal generating circuit to the CCD, between a first frequency, which is generated on the basis of a clock that is supplied from a clock generating circuit, and a second frequency which is higher than the first frequency, in accordance with a read mode which is selected from a plurality of read modes.

However, in some types of CCDs, a driving frequency, which is set by specifications, needs to be used for stable operations. Even in cases where the driving frequency is variable, the operation may become unstable when the driving frequency is dynamically varied.

When the driving frequency for the CCD is lowered, the transfer time of a charge (pixel signal) from a light-receiving element (photodiode) of the CCD increases. For example, if intense light is incident, leakage of charge from the light-receiving element to a vertical CCD occurs and mixes in the read charge. That is, smear occurs. As the read time becomes longer, the leakage of charge becomes greater. Thus, if the driving frequency is lowered and the read time is increased as in the prior art, the image quality may deteriorate.

BRIEF SUMMARY OF THE INVENTION

According to an aspect of the present invention, there is provided a camera which generates a timing signal for driving an image-capturing element and reads a pixel signal, comprising: an operation mode setting unit which sets one of a plurality of operation modes having different time periods necessary for reading an effective pixel signal for one frame at a time of successively reading pixel signals of a plurality of frames from the image-capturing element; a setting state control unit which causes the operation mode setting unit to set one of the operation modes, in which the time period necessary for reading the effective pixel signal for one frame is shorter; a discrimination unit which discriminates, in each of frame periods of the operation mode set by the setting state control unit, whether the timing signal is output during the time period necessary for reading the pixel signal for one frame; and a stopping unit which stops output of the timing signal to the image-capturing element in accordance with a discrimination result of the discrimination unit.

According to another aspect of the present invention, there is provided a camera which generates a timing signal for driving an image-capturing element and reads a pixel signal, comprising: a frame period setting unit which sets a period of one frame at a time of successively reading pixel signals of a plurality of frames from the image-capturing element; an operation mode setting unit which sets one of a plurality of operation modes having different time periods necessary for reading an effective pixel signal for one frame from the image-capturing element; a determination unit which determines whether an image quality priority state is set; a setting state control unit which causes, when the determination unit determines that the image quality priority state is not set, the frame period setting unit to set a longer frame period and causes the operation mode setting unit to set one of the operation modes, in which the time period necessary for reading the effective pixel signal for one frame is shorter, while a frequency of the timing signal for driving the image-capturing element is maintained at a predetermined frequency; a discrimination unit which discriminates, in each frame period, whether the timing signal is output during the time period necessary for reading the pixel signal for one frame; and a stopping unit which stops output of the timing signal to the image-capturing element in accordance with a discrimination result of the discrimination unit.

According to still another aspect of the present invention, there is provided a camera which generates a timing signal for driving an image-capturing element and reads a pixel signal, comprising: a frame period setting unit which sets a period of one frame, in which a pixel signal is read of the image-capturing element, at a first period or a second period that is longer than the first period; a timing signal output unit which outputs the timing signal of a specific frequency to the image-capturing element, without being affected by a setting state of the frame period by the frame period setting unit; a discrimination unit which discriminates whether the timing signal, which is output from the timing signal output unit, is output during the time period necessary for reading the pixel signal for one frame; and a stopping unit which stops output of the timing signal to the image-capturing element in accordance with a discrimination result of the discrimination unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general descrip

FIG. 4A and FIG. 4B show operations of a 4/8 line thinning mode (with horizontal addition) and a 4/8 line thinning mode (without horizontal addition);

FIG. 5A and FIG. 5B show operations of a 4/16 line thinning mode (with horizontal addition) and a 4/16 line thinning mode (without horizontal addition);

FIG. 6A, FIG. 6B, FIG. 6C, and FIG. 6D show transfer periods of pixel signals and picture images in 1-frame periods in the driving modes of the 4/8 line thinning mode (with horizontal addition) and 4/16 line thinning mode (with horizontal addition);

FIG. 9A, FIG. 9B and FIG. 9C show the relationship between the 1-frame period and the pixel signal in cases of frame rates of 60 fps and 30 fps in the 4/16 line thinning mode (with horizontal addition);

FIG. 10A, FIG. 10B and FIG. 10C illustrate how an error in clamp level occurs when the timing signal is stopped in a V-blank period;

FIG. 11A, FIG. 11B and FIG. 11C show a case in which a dummy transfer is executed in a predetermined period immediately before the start of a transfer period of a subsequent frame in the embodiment; and FIG. 12A, FIG. 12B, FIG. 12C and FIG. 12D show a case in which a dummy transfer is executed intermittently in a plurality of predetermined periods before the start of a transfer period of a subsequent frame in the embodiment.

DETAILED DESCRIPTION OF THE INVENTION

An embodiment of the present invention will now be described with reference to the accompanying drawings.

Figure 1:
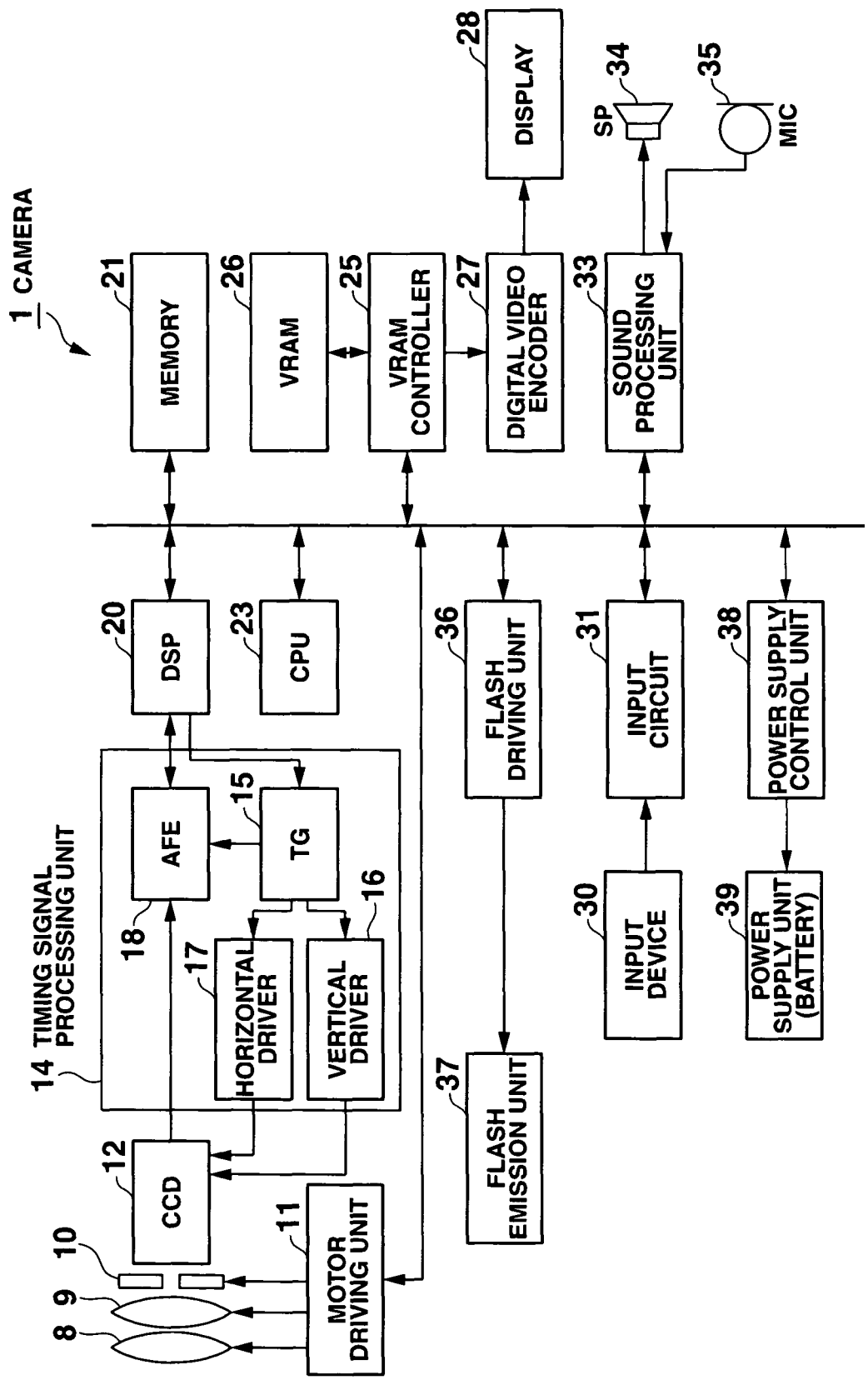
- FIG. 1 is a block diagram showing a detailed structure of a camera 1 according to an embodiment of the present invention.

FIG. 1 is a block diagram showing the detailed structure of a camera 1 in the embodiment of the invention.

In the camera 1 shown in FIG. 1, in an image capturing mode that is the basic mode, a focusing lens 8, a zoom lens 9 and an aperture stop 10, which are included in a lens optical system, are shifted to lens positions and an aperture stop position according to image-capturing by a motor that is driven by a motor driving unit 11 under the control of a CPU 23.

A charge coupled device (CCD) 12, which is an image-capturing element disposed on a back side along the image-capturing optical axis of the lens optical system, accumulates a charge corresponding to an incident light amount on a pixel-by-pixel basis and is scan-driven by a signal from a timing signal processing unit 14. In every predetermined cycle, a pixel signal corresponding to a focused optical image is read from the CCD 12. The timing signal processing unit 14 includes a timing generator (TG) 15, a vertical driver 16, a horizontal driver 17, and an analog front-end (AFE) 18.

The timing generator 15 outputs timing signals (vertical pulses and horizontal pulses) to the vertical driver 16 and horizontal driver 17 on the basis of a reference clock signal which is supplied from a digital signal processor (DSP) 20. The vertical driver 16 amplifies the input vertical pulse, and outputs the amplified vertical pulse to vertical CCDs (see FIG. 4A, FIG. 4B, FIG. 5A and FIG. 5B) of the CCD 12. The horizontal vertical driver 17 amplifies the input horizontal pulse, and outputs the amplified horizontal pulse to horizontal CCDs (see FIG. 4A, FIG. 4B, FIG. 5A and FIG. 5B) of the CCD 12.

A signal charge, which is accumulated in the CCD 12, is successively read as a pixel signal of a voltage corresponding to the signal charge, on the basis of the vertical pulse which is applied from the vertical driver 16, and the horizontal pulse which is applied from the horizontal driver 17.

Figure 2:
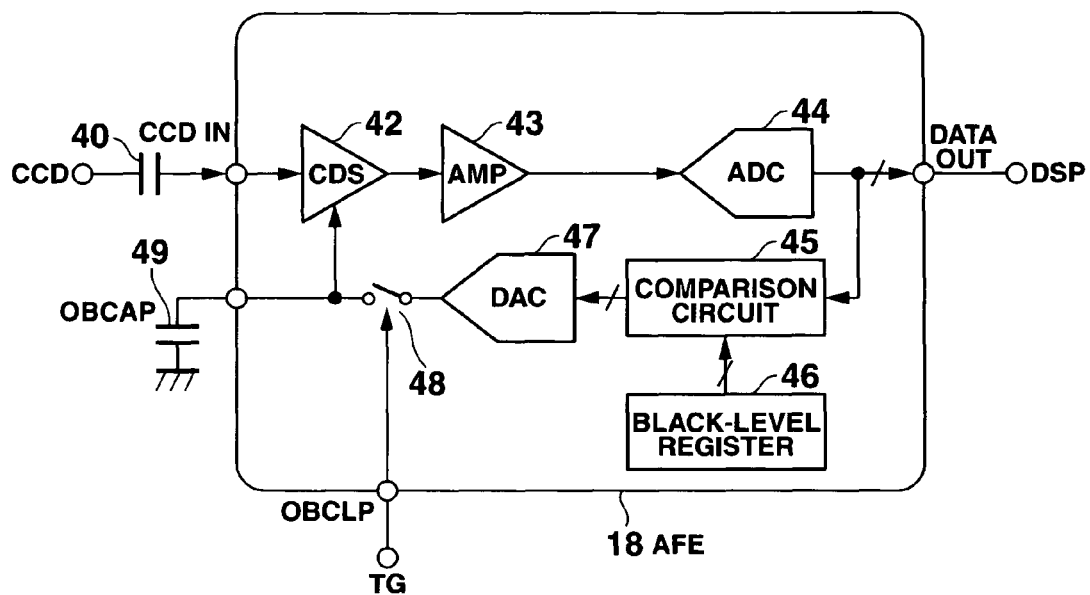
FIG. 2 is a block diagram schematically showing the structure of an analog front-end 18 in the embodiment.

The pixel signal, which is read from the CCD 12, is input to the analog front-end 18 via a capacitor (not shown, see FIG. 2). FIG. 2 is a block diagram that schematically shows the structure of the analog front-end 18. The analog front-end 18, as shown in FIG. 2, includes a correlated double sampling (CDS) circuit 42, an amplifier (AMP) 43, and an analog-to-digital converter circuit (ADC) 44. The CDS 42 subjects the pixel signal (CCD IN), which is input via a capacitor 40, to a correlated double sampling process, and outputs the processed signal. The signal processed by the CDS 42 is gain-controlled by the amplifier 43, and delivered to the analog-to-digital converter circuit 44. Based on the timing signal, the analog-to-digital converter circuit 44 converts the pixel signal, which is amplified by the amplifier 43, to a digital signal on a pixel-by-pixel basis, and outputs the digital signal as pixel data (DATA) to the DSP 20.

In addition, in order to execute a clamp process for making a signal level of a signal, which is supplied from an optical black (OB) region provided in the CCD 12, agree with a reference level, the analog front-end 18 further includes a comparison circuit 45, a black-level register 46, a digital-to-analog converter circuit 47, a switch 48, and a capacitor 49.

In the CCD 12, the OB region, where a part of the pixels is light-shielded and no photoelectric conversion is performed, is disposed, for example, around CCD effective pixels. In the CCD 12, even in the light-shielded OB region, an output signal due to, e.g. dark current occurs. Thus, an output voltage due to the dark current is canceled by the clamp process and the signal level is made to agree with the reference level.

The comparison circuit 45 compares the pixel data, which is output from the analog-to-digital converter circuit 44, with a reference black level which is preset in the black level register 46, and outputs data corresponding to the level difference to the analog-to-digital converter circuit 47. The analog-to-digital converter circuit 47 converts the digital data from the comparison circuit 45 to an analog signal.

The switch circuit 48 is turned on by an OB clamp signal (OBCLP) which is input from the timing generator 15 at the timing of driving for the OB region of the CCD 12. Thus, the capacitor 49 (OBCAP) is charged/discharged by a current which is output from the analog-to-digital converter circuit 47 at the timing of driving for the OB region, and the current is fed back to the CDS circuit 42. As a result, the potential of the capacitor 49 stabilizes so that the output from the analog-to-digital converter circuit 44, which corresponds to the signal input from the CCD 12 during the OB period, may become zero, that is, a proper clamp level.

In the case where the output of the driving pulse (timing signal) for the CCD 12 is stopped during the OB period, the capacitor 49 is no longer charged since the pixel signal is not input from CCD 12 to the analog front-end 18. Consequently, with the passing of time, an error of the clamp level from the proper level increases. In the present embodiment, power consumption is reduced by stopping the output of the timing signal (horizontal pulse, vertical pulse) from the timing generator 15 during the V-blank period after the end of the read (transfer time) of the pixel signal from the CCD 12 (details will be described later). As a result, the clamp level would depart from the proper level. To avoid this, dummy transfer is executed during a period until the transfer period of the next frame, and thereby the clamp level can be restored. The dummy transfer can be executed, for example, during a predetermined period immediately before the start of the transfer period of the next frame (see FIGS. 10A, 10B and 10C), or the dummy transfer can be executed intermittently during predetermined time periods before the start of the transfer period of the next frame (see FIGS. 11A, 11B and 11C).

Figure 3:
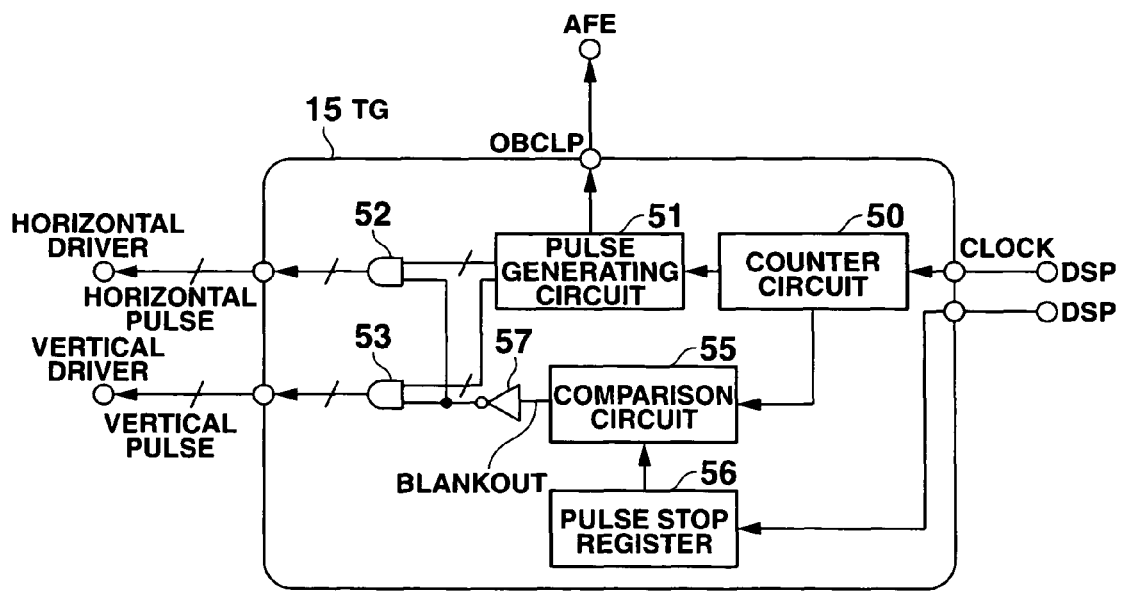
FIG. 3 is a block diagram schematically showing the structure of a timing generator 15 in the embodiment.

FIG. 3 is a block diagram schematically showing the structure of the timing generator 15. The timing generator 15, as shown in FIG. 3, includes a counter circuit 50, a pulse generating circuit 51, AND circuits 52 and 53, a comparison circuit 55, a pulse stop register 56, and a NOT circuit 57.

The counter circuit 50 executes a predetermined counting operation in accordance with successive clock signals supplied from the DSP 20. The counter circuit 50 includes, for example, a horizontal counter which executes counting for one line, and a vertical counter which executes counting for one field.

The pulse generating circuit 51 generates and supplies clock pulses which are necessary for a process of each block, on the basis of the count value obtained by the counter 50. Specifically, the pulse generating circuit 51 outputs horizontal pulses to the AND circuit 52, which are to be supplied to the horizontal driver 17, and outputs vertical pulses to the AND circuit 53, which are to be supplied to the vertical driver 16. In addition, the pulse generating circuit 51 outputs an OB clamp signal (OBCLP) to the analog front-end 18 at the time of driving for the OB region of the CCD 12.

The pulse generating circuit 51 can alter the 1-frame period under the control of the DSP 20. In the present embodiment, for example, when the driving mode at the time of through-image display is a 4/16 thinning mode (with horizontal addition) (details will be described later), the 1-frame period can be changed to a first period in which the 1-frame period is set at about 16 ms (60 fps), or to a second period in which the 1-frame period is set at about 33 ms (30 fps) (operation mode setting unit). In this case, the pulse generating circuit 51 outputs specific timing signals (vertical pulse, horizontal pulse) (with optimal driving frequency), regardless of the setting of the frame period.

On the other hand, the comparison circuit 55 compares the counter value, which is counted by the counter circuit 50, with a value set in the pulse stop register 56 by the DSP 20, and outputs a BLANKOUT signal for stopping the output of the timing signal from the pulse generating circuit 51 (discrimination unit). The BLANKOUT signal that is output from the comparison circuit 55 is delivered to the AND circuits 52 and 53 via the NOT circuit 57. When the signal from the NOT circuit 57 is at low level, the AND circuits 52 and 53 stop generation of the pulse signals from the pulse generating circuit 51 (stopping unit).

In the pulse stop register 56, a value for discriminating that the timing signals have been output from the pulse generating circuit 51 for a time period necessary for reading pixel signals for one frame is set. Thus, the comparison circuit 55 compares the value of the counter circuit 50 and the value of the pulse stop register 56, and stops the output of the timing signals to the COD 12 at a time when the timing signals, which are needed for reading 1-frame pixel signals have been output from the pulse generating circuit 51 (i.e., when the transfer period of pixel signals ends).

After the end of a transfer period, dummy transfer for correcting an error of the OB clamp level is executed during a period before the start of the transfer period of the next frame. For this purpose, the pulse stop register 56 is set by the DSP 20 so as to control the dummy transfer period. For example, the dummy transfer is executed in a predetermined time period immediately before the start of the transfer period of the next frame (see FIGS. 10A, 10B and 10C), or executed intermittently in predetermined time periods before the start of the transfer period of the next frame (see FIGS. 11A, 11B and 11C). In intervening time periods, the output of the timing signals is stopped.

In the structure shown in FIG. 3, when the pulse output stop signal (BLANKOUT signal) is output from the comparison circuit 55, both the horizontal pulse and vertical pulse are not output at the same time. Alternatively, for example, such a structure that only the horizontal pulse is not output may be adopted (i.e., the AND circuit 53 is made needless). Specifically, in the present embodiment, when the pulse output stop signal is output, at least one of the horizontal pulse and the vertical pulse is not output, and thereby power consumption can be reduced.

Digital pixel data, which has been subjected to a preprocess such as an analog process or an analog-to-digital conversion process by the analog front-end 18, is output to the DSP 20. The DSP 20 includes a white balance circuit, a gamma correction circuit, a YC process circuit and a compression/decompression circuit. The DSP 20 subjects the output data from the analog front-end 18 to various digital processes, and records the processed data in a memory 21.

The CPU 23 executes an overall control of the camera 1. At the time of image capturing, the CPU 23 executes an autofocus (AF) control, an auto-exposure (AE) control, etc., on the basis of the operation program stored in the memory 21. In addition, the CPU 23 executes a through-image display setting process, and can set the image quality at the time of through-image display by the user's designation input. Moreover, based on the through-image display setting, the CPU 23 controls the timing signal output operation by the timing generator 15 via the DSP 20 by a through-image display driving setting process.

A digital video encoder 27 periodically reads out data, which is stored in the memory 21, via a VRAM controller 25, and generates a video signal on the basis of the read data and outputs the video signal to a display 28.

The display 28 functions as a monitor display unit (electronic finder) at the time of the image-capturing mode, and performs display on the basis of the video signal from the digital video encoder 27. Thereby, the display 28 displays, in real time, an image (through-image) based on the data that is taken in from the VRAM controller 25.

If the shutter key of an input device 30 is operated at the timing of capturing a still image in the state in which the through-image is displayed in real time on the display 28, a trigger signal is generated.

Responding to the trigger signal, the CPU 23 stops the driving of the CCD 12, executes the auto-exposure process to obtain a proper exposure value, and executes once again image-capturing by controlling the aperture stop of the lens optical system and the exposure time of the CCD 12.

After the newly obtained 1-frame image data is written in the memory 21, the 1-frame image data written in the memory 21 is encoded by the Joint Photographic Experts Group (JPEG) method.

The encoded image data is written in a nonvolatile memory card (not shown) which is detachably attached to the camera 1 as a recording medium, or in a nonvolatile built-in memory in the case where the memory card is not attached.

Upon completion of the writing of the 1-frame image data in the memory card or the built-in memory, the CPU 23 resumes the operation of monitor-displaying the through-image on the display 28 from the CCD 12 via the memory 21.

An input circuit 31, a sound processing unit 33, a flash driving unit 36 and a power supply control unit 38 are connected to the CPU 23.

The input device 30 includes various keys and buttons, such as a power key, a shutter key, a mode switching key, a menu key, a selection key and a cross key (cursor key), and a pointing device such as a touch panel. The input circuit 31 inputs a signal corresponding to an input operation on the input device 30, and informs the CPU 23 of the input signal.

The sound processing unit 33 includes a sound source circuit such as a PCM sound source. When sound is to be recorded, the sound processing unit 33 digitizes a sound signal that is input from a microphone unit (MIC) 35, and compresses the digital data in a predetermined data format, such as MPEG-1 Audio Layer-3 (MP3), thus forming a sound data file and storing it in the memory 21 or memory card (not shown). On the other hand, when sound is to be reproduced, the sound processing unit 33 decompresses the sound data file, which is read out of the memory 21 or memory card, into an analog signal and drives a speaker unit (SP) 34 to produce sound.

Further, under the control of the CPU 23, the sound processing unit 33 generates various operational sounds such as a pseudo-shutter sound associated with the operation of the shutter key, or a beep associated with other key operations, and the generated sound is produced from the speaker unit 34.

The flash driving unit 36 charges a large-capacity capacitor for a flash tube (not shown) at the time of capturing a still image, and drives a flash emission unit 37 under the control of the CPU 23.

The power supply control unit 38 executes a control to supply a current to various units from a power supply unit (battery) 39. The power supply control unit 38 monitors the residual power in the power supply unit 39 and informs the CPU 23 of the residual power.

Next, the operation of the camera 1 according to the embodiment is described.

In general, in the camera 1, at the time of capturing a motion picture or at the time of displaying a through-image, the length of a 1-frame period can voluntarily be set in accordance with which of items, such as smoothness of motion picture and reduction in record data amount, is prioritized. In addition, a thinning driving mode of the COD can voluntarily be set in accordance with which of items, such as an image data resolution and signal-to-raise ratio of image data, is prioritized. On the basis of the thinning driving mode of the COD 12, the number of times of driving, which is necessary for transferring 1-frame image data, is determined. A value that is obtained by multiplying the driving frequency of the timing signal, which is output from the pulse generating circuit, by the number of times of driving is a transfer time that is necessary for the transfer of 1-frame image data. In the prior art, the thinning driving mode of the COD and the driving frequency of the timing signal are set so that this transfer time may become substantially equal to the 1-frame period.

On the other hand, in the camera 1 of the present embodiment, in the motion picture display, it is determined whether a current display state is a state in which higher smoothness or higher resolution is not necessary. For example, a through-image display state is determined to be a state in which higher smoothness or higher resolution is not necessary. In such a state, for example, the driving frequency of the timing signal is maintained at a proper frequency matching with the specifications of the CCD 12 and the 1-frame period is set at a great length. Alternatively, the thinning driving mode of the CCD 12 is set at a mode in which the number of times of driving is smaller. Alternatively, even in the same thinning driving mode, driving without horizontal addition may be switched to driving with horizontal addition.

By this setting, in the 1-frame period, the ratio of the driving period (V-blank period) in which effective pixel data is not transferred becomes greater. Since the operation of the CCD 12 in the V-blank period is needless, the output of the timing signal for driving the CCD 12 is stopped during the V-blank period. Thereby, excess power consumption in the V-blank period can be suppressed. Moreover, since the driving frequency of the timing signal is maintained at the proper frequency for the CCD 12, the time necessary for reading out the pixel signal does not increase, and the occurrence of smear can be reduced.

On the other hand, if the V-blank period is simply increased and the output of the timing signal for driving the CCD 12 is stopped, the operation of maintaining the reference level by the clamp process of the analog front-end 18 (OB clamp circuit) is also stopped and the reference level gradually deviates from the proper clamp level became of, e.g., self-discharge of the capacitor 49 (OBCAP) of the analog front-end 18. When the next frame begins, the error of the reference level is not immediately corrected during the next-frame period. In order to prevent this problem, prior to the beginning of the transfer period of the next frame, dummy transfer is executed by outputting the minimum necessary timing signals which prevent the reference level from greatly deviating from the proper clamp level.

Next, a description is given of the driving method of the CCD 12, which is switched in accordance with the difference of the operation mode in the present embodiment. Specifically, the driving method in the monitor mode (through-image display mode) is described. It is assumed that in the CCD 12 of the camera 1 of this embodiment, the following four thinning driving modes are usable in the driving method in the monitor mode: (1) 4/8 line thinning mode (with horizontal addition), (2) 4/8 thinning mode (without horizontal addition), (3) 4/16 line thinning mode (with horizontal addition), and (4) 4/16 thinning mode (without horizontal addition).

The transfer control operation of pixel signals from the CCD 12 in each of the driving modes is described. FIG. 4A and FIG. 4B show the operations of the (1) 4/8 line thinning mode (with horizontal addition) and the (2) 4/8 thinning mode (without horizontal addition). FIG. 5A and FIG. 5B show the operations of the (3) 4/16 line thinning mode (with horizontal addition) and the (4) 4/16 thinning mode (without horizontal addition).

The CCD 12 is configured to transfer all pixel data by dividing pixels into a plurality of fields. As shown in FIGS. 4A and 4B and FIGS. 5A and 5B, in the CCD 12, photodiodes 60 are matrix-arrayed as light-receiving elements. A plurality of vertical CCDs 61 are vertically arranged between the photodiodes 60. A single horizontal CCD 62 is horizontally disposed at one end of the vertical CCDs 61. Signal charges, which are accumulated in the photodiodes 60, are read to the associated vertical CCDs 61 in response to vertical pulses which are supplied from the timing generator 15 via the vertical driver 16. The read signal charges are transferred through the vertical CCDs 61 toward the horizontal CCD 62. The signal charges, which are transferred through the vertical CCDs 61, are then transferred through the horizontal CCD

62. The signal charges are transferred toward an amplifier 63 through the horizontal CCD 62 and are output from the amplifier 63.

As shown in FIG. 4A, in the (1) ⅘ line thinning mode (with horizontal addition), the pixels are thinned to ½ in the vertical direction, and every two horizontal pixels and every two vertical pixels are added in the horizontal CCD 62. Thus, four pixels in total are added. As a result, the amount of data, which is output from the CCD 12, is reduced to ¼, compared to the case of reading the entire image (the pixels marked in black in FIG. 4A are not read).

In the driving mode of the (1) ⅘ line thinning mode (with horizontal addition), for example, the frame rate is 30 fps and the effective output size is 1308×490 (horizontal×vertical).

In this driving mode (1), the resolution in the vertical direction is 490 lines. Thus, the driving mode (1) is mainly used for capturing motion video of Video Graphics Array (VGA) (680×480) standard. Since the horizontal addition is executed, the horizontal resolution is reduced to ½, compared to the driving mode (2) (without horizontal addition). However, since the resolution is 1308 and is sufficiently large, compared to the horizontal resolution of 680 of the VGA standard, no problem arises. In addition, since the horizontal addition is executed, the frame rate is doubled, compared to the driving mode (2) (without horizontal addition).

FIG. 6A shows a transfer period of pixel signals in 1-frame period at the time of driving in the ⅘ line thinning mode (with horizontal addition). FIG. 6B shows a picture image formed by read pixel signals. In this case, the 1-frame period is about 33 ms (30 fps).

In the (2) ⅘ line thinning mode (without horizontal addition) shown in FIG. 4B, the pixels are thinned to ½ in the vertical direction, and the pixels are not added in the horizontal CCD 62. Thus, the amount of data output from the CCD 12 is ½, compared to the case of reading the entire image.

In the driving mode of the (2) ⅘ line thinning mode (without horizontal addition), for example, the frame rate is 15 fps and the effective output size is 2616×490 (horizontal×vertical). Of the thinning driving modes (1) to (4), the driving mode (2) has a maximum resolution, but has a lowest frame rate of 15 fps.

As shown in FIG. 5A, in the (3) 4/16 line thinning mode (with horizontal addition), the pixels are thinned to ¼ in the vertical direction, and every two horizontal pixels and every two vertical pixels are added in the horizontal CCD 62. Thus, four pixels in total are added. As a result, the amount of data, which is output from the CCD 12, is reduced to ⅛, compared to the case of reading the entire image.

In the (3) 4/16 line thinning mode (with horizontal addition), for example, the frame rate is 60 fps and the effective output size is 1308×245 (horizontal×vertical). In the driving mode (3), the vertical resolution is 245, but the frame rate is 60 fps and very high. Therefore, the driving mode (3) is suitable for AF.

FIG. 6C shows a transfer period of pixel signals in 1-frame period at the time of driving in the 4/16 line thinning mode (with horizontal addition). FIG. 6D shows a picture image formed by read pixel signals. In this case, the 1-frame period is about 16 ms (60 fps).

In the driving mode of the (4) 4/16 line thinning mode (without horizontal addition), for example, the frame rate is 30 fps and the effective output size is 2616×245 (horizontal×vertical). In the driving mode (4), the vertical resolution is 245. If it is assumed that the display 28 is designed based on the Quarter Video Graphics Array (QVGA) standard, the vertical resolution is substantially equal. In addition, the frame rate is 30 fps, and is suitable for display driving in the normal monitor mode.

Next, a description is given of the control of the driving method for the CCD 12 at the time of through-image display in the present embodiment.

In the camera 1 of the present embodiment, the image quality at the time of through-image display can voluntarily be set by the user designation. By lowering the image quality in the through-image display, the 1-frame period at the time of driving the CCD 12 is increased (i.e., the frame rate is decreased), and the output of the timing signal is stopped in time periods other than the transfer period of the pixel signals. Thereby, power consumption can be reduced.

Figure 7:
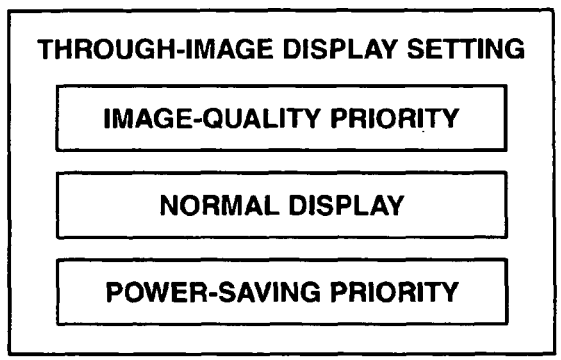
FIG. 7 shows an example of a through-image display setting screen in the embodiment.

To begin with, if a through-image display setting request is input by the user by a predetermined operation on the input device 30, the CPU 23 starts a through-image display setting process and causes the display 28 to display a through-image display setting screen, for example, as shown in FIG. 7.

The through-image display setting screen includes "NORMAL DISPLAY" for setting normal through-image display, "IMAGE-QUALITY PRIORITY" for setting through-image display with a higher quality than normal through-image display, and "POWER-SAVING PRIORITY" for lowering the image quality of through-image display and realizing power saving. These items can voluntarily be designated, for example, by a cursor key operation of the input device 30.

In the present embodiment, when "IMAGE-QUALITY PRIORITY" is designated, the ⅘ line thinning mode (with horizontal addition) is executed. When "NORMAL DISPLAY" is designated, the 4/16 line thinning mode (with horizontal addition) (60 fps) (or the 4/16 line thinning mode (without horizontal addition)) is executed. When "POWER-SAVING PRIORITY" is designated, the 4/16 line thinning mode (with horizontal addition) is executed and the frame rate is decreased to 30 fps. Thus, the CCD 12 is driven and the image signals are read.

If an instruction to designate any one of the items on the through-image display setting screen is input, the CPU 23 executes the through-image display driving setting process on the basis of the designated setting. Thereby, the CPU 23 controls the timing signal output operation by the timing generator 15 via the DSP 20 (frame period setting (changing) unit).

Figure 8:
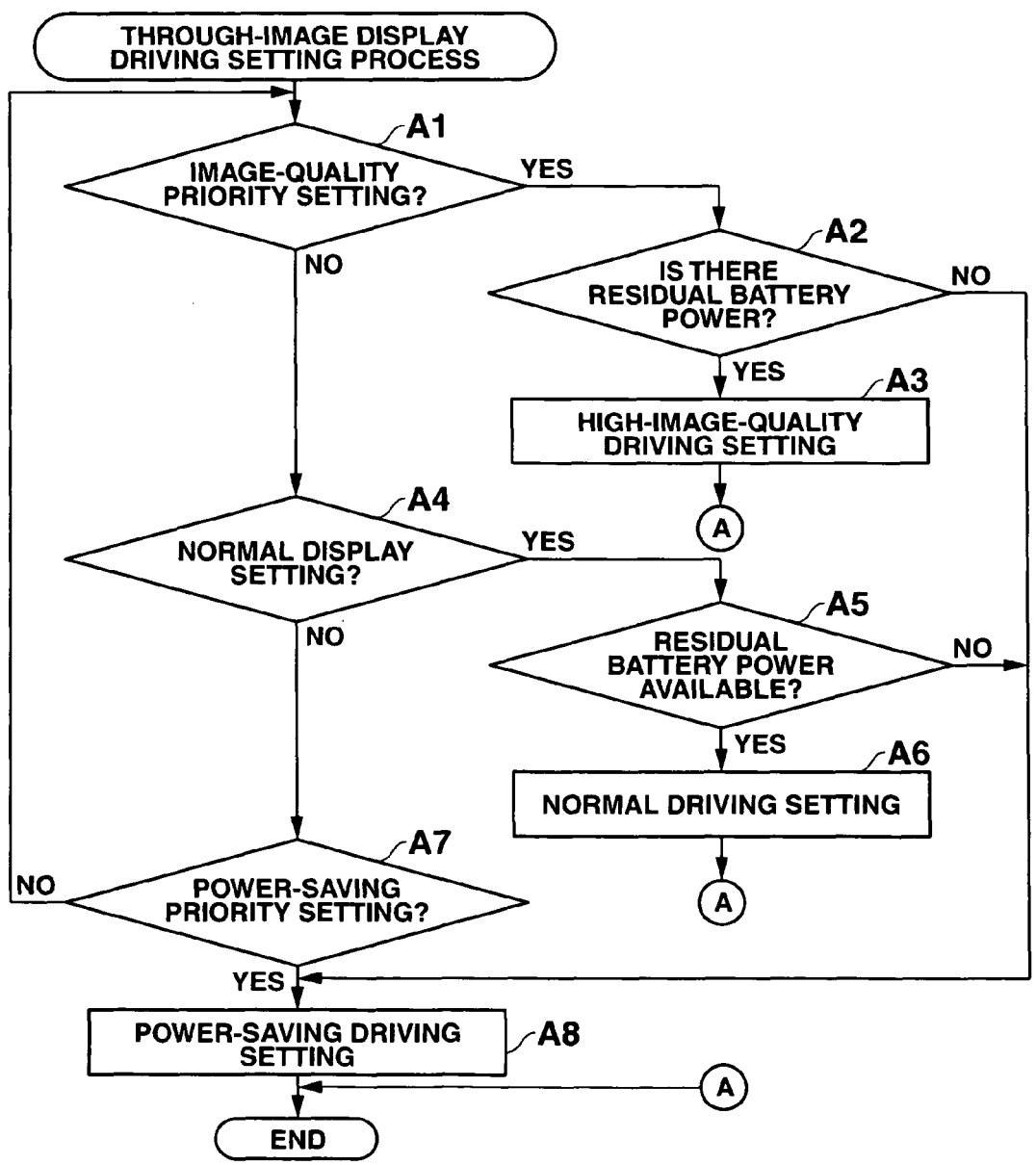
FIG. 8 is a flowchart illustrating the operation of a through-image display driving setting process.

FIG. 8 is a flowchart for describing the through-image display driving setting process.

If the "IMAGE-QUALITY PRIORITY" is set in the through-image display setting (Yes in step A1) (determination unit), the CPU 23 discriminates whether the residual power of the power supply unit 39, which is monitored by the power supply control unit 38, is at a preset reference level or less. If the residual power of the power supply unit 39 is at the preset reference value or less (No in step A2), the CPU 23 instructs the timing generator 15 via the DSP 20 to execute power-saving driving (4/16 line thinning mode (with horizontal addition) 30 fps) (step A8) (setting state control unit). The control for the timing generator 15 in this case will be described later (see FIG. 9A, 9B, 9C). When a through-image is to be displayed, no problem arises if the frame rate is 30 fps.

Specifically, even if the "IMAGE-QUALITY PRIORITY" is set, if the pixel signal read is executed by the ⅘ line thinning mode (with horizontal addition) (60 fps), the power consumption is large and the possible driving time decreases. Thus, if the residual power of the battery is small, the power-saving driving is forcibly set.

On the other hand, if the residual power is greater than the reference value (Yes in step A2), the CPU 23 instructs the timing generator 15 via the DSP 20 to execute high-image-quality driving (⁴/₈ line thinning mode [with horizontal addition]) (step A3).

If the "NORMAL DISPLAY" is set in the through-image display setting (Yes in step A4), the CPU 23 discriminates, in the same manner as described above, whether the residual power of the power supply unit 39, which is monitored by the power supply control unit 38, is at the preset reference level or less. In this case, the reference value may be set at a value higher than the reference value which is used when the "IMAGE-QUALITY PRIORITY" is set. If the residual power of the power supply unit 39 is the preset reference value or less (No in step A5), the CPU 23 instructs, in the same manner as described above, the timing generator 15 via the DSP 20 to execute power-saving driving (⁴/₁₆ line thinning mode [with horizontal addition] 30 fps) (step A8).

On the other hand, if the residual power of the battery is greater than the reference value (Yes in step A5), the CPU 23 instructs the timing generator 15 via the DSP 20 to execute normal display driving (⁴/₁₆ line thinning mode [with horizontal addition] or ⁴/₁₆ line thinning mode [without horizontal addition]) (step A6).

If the "POWER-SAVING PRIORITY" is set in the through-image display setting (Yes in step A7), the CPU 23 instructs the timing generator 15 via the DSP 20 to execute power-saving driving (⁴/₁₆ line thinning mode [with horizontal addition] 30 fps) (step A8) (setting state control unit).

FIGS. 9A, 9B and 9C show the relationship between the 1-frame period and the pixel signal transfer period in the cases of 60 fps and 30 fps in the ⁴/₁₆ line thinning mode (with horizontal addition).

Compared to the case where the 1-frame period is set at about 16 ms (60 fps) as shown in FIG. 9A, when the 1-frame period is set at about 33 ms (30 fps) as shown in FIG. 9B, the V-blank period becomes longer if the transfer period of the pixel signal from the CCD 12 (i.e., the output period of the timing signal) is the same. Since the pixel signal is not transferred in the V-blank period, power saving can be achieved by stopping the output of the timing signal in this period. FIG. 9C shows a picture image that is formed by the read pixel signal.

In this case, the DSP 20 sets the same value as in the case where the frame rate is 60 fps, in the pulse stop register 56 of the timing generator 15. The pulse generating circuit 51 outputs the timing signal of a fixed driving frequency, regardless of the change of the frame rate. Thus, even when the frame rate is 30 fps, the comparison circuit 55 outputs the BLANK-OUT signal at the same timing as in the case of 60 fps, and stops the output of signals from the vertical driver 16 and horizontal driver 17. Thereby, power consumption in the V-blank period can be reduced.

FIG. 9A and FIG. 9B show the case where in the driving mode of the ⁴/₁₆ line thinning mode (with horizontal addition) (60 fps), the 1-frame period is increased (the frame rate is changed to 30 fps) and the V-blank period is increased (the driving frequency of the timing signal is the same). As regards the method of increasing the V-blank period in 1-frame, it is possible to set the thinning driving mode of the CCD 12 to a mode with a less number of times of driving, or to set the thinning driving mode without horizontal addition to the thinning driving mode with horizontal addition even if the same thinning driving mode is executed.

For example, by changing the driving mode of the ⁴/₈ line thinning mode (with horizontal addition) shown in FIG. 6A to the driving mode of the ⁴/₁₆ line thinning mode (with horizontal addition) shown in FIG. 9B, the V-blank period can be increased without changing the 1-frame period and the frame rate.

In addition, by changing the driving mode of the ⁴/₁₆ line thinning mode (without horizontal addition) (30 fps) to the ⁴/₁₆ line thinning mode (with horizontal addition) shown in FIG. 9B, the V-blank period can similarly be increased. By increasing the V-blank period and stopping the output of the timing signal in this period, power saving can be achieved.

In the above description, the control is executed to perform the power-saving driving when the residual battery power is the reference value or less in the case where the "IMAGE-QUALITY PRIORITY" or "NORMAL DISPLAY", and "POWER-SAVING PRIORITY", is set in the through-image display setting. Alternatively, a control may be executed to perform the power-saving driving when the residual power of the power supply unit 39 decreases to the preset reference value or less, regardless of the designation of the image quality of the through-image.

Specifically, the CPU 23 is informed of the residual power of the power supply unit 39 that is monitored by the power supply control unit 38. If the residual power decreases to the reference value or less, the CPU 23 controls the timing generator 15 via the DSP 20, without the input of, e.g., designation by the user, thereby to change the driving mode of the CCD 12 at the time of through-image display to the power-saving driving mode.

Next, a description is given of a method of correcting an error of a clamp level (clamp error) which would occur when the output of the timing signal is stopped in the V-blank period and the pixel signal is not input to the analog front-end 18.

FIGS. 10A, 10B and 10C show the state of occurrence of an error of the clamp level when the output of the timing signal is stopped in the V-blank period.

In the clamp process in the analog front-end 18, the capacitor 49 is charged/discharged on the basis of the output of the analog-to-digital conversion circuit 44 which corresponds to the pixel signal input from the CCD 12. Thereby, the clamp level is adjusted (see FIG. 2). Thus, when the output of the timing signal is stopped, no pixel signal is input from the CCD 12 to the analog front-end 18. Consequently, the capacitor 49 is not charged and, as shown in FIG. 10C, an error from the proper clamp level (indicated by broken lines) increases with the passing of time due to the self-discharge of the capacitor 49 during the period in which the timing signal is not output, that is, during the V-blank period (indicated by "B" in FIG. 10C).

Since the clamp level is not a proper level in the initial stage (indicated by "A" in FIG. 10C) of the transfer period of the next frame period, pixel data of an erroneous color, which differs from the normal color, is output.

On the other hand, in the timing signal processing unit 14 of the present embodiment, as shown in FIGS. 11A, 11B and 11C or FIGS. 12A, 12B and 12C, dummy transfer is executed after the end of the transfer period of the pixel signal and before the beginning of the transfer period of the next frame. Thereby, the clamp level is restored.

In the method shown in FIGS. 11A, 11B and 11C, the dummy transfer is executed in a predetermined period immediately before the start of the transfer period of the next frame.

In this case, the DSP 20 sets the pulse stop register 56 so as to stop the output of the timing signal only in the V-blank period shown in FIG. 11A, and to output the timing signal in the dummy transfer period. In accordance with the value of the pulse stop register 56, the comparison circuit 55 outputs the BLANKOUT signal only in the V-blank period. The pulse stop register 56 is so set by the DSP 20 as to execute the dummy transfer during a period, by which the clamp level can be restored, in accordance with the length of the V-blank period, that is, the degree of the error of the clamp level.

Thereby, a dummy pixel signal is input to the analog front-end 18, and the adjustment of the clamp level is executed. As shown in FIG. 11C, the clamp level can be restored to the proper level before the transfer period of the next frame begins.

In the method shown in FIGS. 12A, 12B, 12C and 12D, dummy transfer is intermittently executed in a plurality of predetermined periods before the transfer period of the next frame begins.

In this case, the DSP 20 sets the pulse stop register 56 so that the BLANKOUT signals are intermittently output from the comparison circuit 55 after the end of the transfer period, that is, the dummy transfer is intermittently executed, as shown in FIG. 12A. In accordance with the value of the pulse stop register 56, the comparison circuit 55 intermittently outputs the BLANKOUT signals. The pulse stop register 56 is so set by the DSP 20 as to execute the dummy transfer by a number of times corresponding to the length of the V-blank period.

Since the dummy pixel signal is input to the analog front-end 18, the adjustment of the clamp level is executed and, as shown in FIG. 12D, the clamp level can be restored to the proper level before the transfer period of the next frame begins. In the method shown in FIGS. 12A to 12D, the dummy transfer is intermittently executed a plurality of times. Accordingly, the error of the clamp level from the proper level does not become large, compared to the method shown in FIGS. 11A to 11C. In addition, since the error of the clamp level from the proper level is not large, it is not necessary to execute the control to vary the dummy transfer period in accordance with the length of the V-blank period.

In the above description, the frame rate of 60 fps in the 4/16 line thinning mode (with horizontal addition) at the time of "NORMAL DISPLAY" is reduced to 30 fps, and the 1-frame period (V-blank period) is increased. Further power-saving can be achieved if the frame rate is reduced stepwise from 30 fps, the V-blank period is increased and the period during which the output of the timing signal is stopped is increased. In this case, the period for executing the dummy transfer is altered stepwise in accordance with the length of the period in which the output of the timing signal is stopped. When the dummy transfer is executed as shown in FIG. 11A, the DSP 20 sets the pulse stop register 56 so as to adjust the length of the dummy transfer period in accordance with the length of the 1-frame period.

In addition, when the dummy transfer is intermittently executed as shown in FIGS. 12A to 12D, the number of times of dummy transfer is varied in accordance with the variation of the 1-frame period. Specifically, the dummy transfer is repeatedly executed so that the error of the clamp level from the proper level may not exceed a predetermined value. When the number of times of the dummy transfer is to be altered, the period of each dummy transfer may be fixed or may be varied in accordance with the number of times of dummy transfer. Since the efficiency of power saving is enhanced as the period of dummy transfer becomes shorter, the dummy transfer period is decreased as far as the degree of the error of the clamp level is not a problem.

In the above description, the driving method for the CCD 12 at the time of through-image display is altered in accordance with the setting of the through-image display by the user. Alternatively, in accordance with the setting for executing the power-saving operation in the camera 1, the driving method for the CCD 12 may be altered and power saving at the time of through-image display may be achieved.

In the above-described embodiment, power saving is achieved by altering the driving method for the CCD 12 at the time of through-image display. For example, at the time of capturing a motion picture, too, the driving method may be altered to achieve power saving. For example, assume now that the user can voluntarily set the image quality at the time of motion picture recording. If motion picture recording with a lower image quality than usual is set, the frame rate is decreased and the blank period is increased. The output of the driving clock in this period is stopped, and thus power saving is achieved.

In the above description, even when the length of one frame is varied, the timing signal is output by maintaining the optimal frequency corresponding to the specifications of the CCD 12. In a case where the CCD 12 can be driven by a timing signal with a frequency higher than a normal driving frequency, the transfer period of the image signal can be reduced and the V-blank period in 1-frame can be increased by increasing the driving frequency even if the length of 1-frame is the same. Thereby, the output of the timing signal in the V-blank period is stopped, and power saving can be achieved, as in the above-described case.

The present invention is not limited to the camera 1 as described in the embodiments. The invention is also applicable to apparatuses having AF-function-equipped cameras, such as mobile phones, timepieces and personal digital assistants (PDAs) with image-capturing functions, video cameras with still-image-capturing functions, and camera-equipped personal computers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
a frame period setting unit which sets a period of one frame, in which a pixel signal is read from an image-capturing element, to be a first period or a second period that is longer than the first period;
a timing signal output unit which outputs a timing signal of a specific frequency to the image-capturing element, without being affected by a setting state of the frame period by the frame period setting unit;
a discrimination unit which discriminates whether the timing signal, which is output from the timing signal output unit, is output during a time period necessary for reading the pixel signal for one frame; and
a stopping unit which stops output of the timing signal to the image-capturing element in accordance with a discrimination result of the discrimination unit,
wherein the timing signal is used to maintain a clamp level for a clamp process to a proper level in addition to driving the image-capturing element, and
wherein, in a case in which the frame period setting unit sets the frame period to be the second period, the stopping unit causes the timing signal to be output from the timing signal output unit to execute a dummy transfer in a predetermined time period immediately before an end of the second period, to restore the clamp level, which has deviated from the proper level due to the stopping of the output of the timing signal.

2. The camera according to claim 1, wherein the timing signal output unit outputs a first timing signal for a horizontal direction and a second timing signal for a vertical direction to the image-capturing element, and the stopping unit stops output of at least one of the first timing signal and the second timing signal.

3. The camera according to claim 1, further comprising:
a display unit which displays an image based on the pixel signal which is read from the image-capturing element; and
an image quality setting unit which inputs a designation of an image quality of the image that is displayed by the display unit, and sets the image quality,
wherein the frame period setting unit sets the frame period to be the first period or the second period in accordance with the image quality set by the image quality setting unit.

4. The camera according to claim 3, further comprising:
a battery; and
a detection unit which detects that a residual power of the battery has decreased to a preset reference value or less,
wherein (i) the frame period setting unit sets the frame period to be the second period in a case in which the image quality setting unit sets the image quality to a first image quality, which is a lower image quality, (ii) the frame period setting unit sets the frame period to be the first period in a case in which the image quality setting unit sets the image quality to be higher than the first image quality, and (iii) the frame period setting unit sets the frame period to be the second period in a case in which the detection unit detects that the residual power of the battery has decreased to the reference value or less when the image quality setting unit sets the image quality to be higher than the first image quality.

5. The camera according to claim 1, further comprising:
a battery; and
a detection unit which detects that a residual power of the battery has decreased to a preset reference value or less,
wherein the frame period setting unit sets the frame period to be the second period in a case in which the detection unit detects that the residual power of the battery has decreased to the reference value or less.

6. The camera according to claim 1, wherein the stopping unit varies the predetermined time period in accordance with a length of the second period that is set by the frame period setting unit.

7. The camera according to claim 1, wherein in the case in which the frame period setting unit sets the frame period to be the second period, the stopping unit causes the timing signal to be output from the timing signal output unit intermittently to execute a plurality of dummy transfers after the discrimination unit discriminates that the timing signal is output in the time period necessary for reading the pixel signal for one frame and before the second period ends.

8. The camera according to claim 7, wherein the stopping unit varies the number of the dummy transfers in accordance with a length of the second period that is set by the frame period setting unit.

9. A timing signal processing apparatus comprising
a frame period changing unit which changes a period of one frame, in which a pixel signal is read from an image-capturing element, from a first period to a second period that is longer than the first period;
a timing signal output unit which outputs timing signal to the image-capturing element, regardless of the change of the frame period by the frame period changing unit;
a discrimination unit which discriminates whether the timing signal, which is output from the timing signal output unit, is output during a time period necessary for reading the pixel signal for one frame; and
a stopping unit which stops output of the timing signal to the image-capturing element by the timing signal output unit in accordance with a discrimination result of the discrimination unit,
wherein the timing signal is used to maintain a clamp level for a clamp process to a proper level in addition to driving the image-capturing element, and
wherein, in a case in which the frame period setting unit sets the frame period to be the second period, the stopping unit causes the timing signal to be output from the timing signal output unit to execute a dummy transfer in a predetermined time period immediately before an end of the second period, to restore the clamp level, which has deviated from the proper level due to the stopping of the output of the timing signal.

* * * * *